United States Patent [19]

Niwa

[11] 4,390,552
[45] Jun. 28, 1983

[54] HEAT-SEALING SHEET MATERIAL

[75] Inventor: Susumu Niwa, Wako, Japan

[73] Assignee: Kabushiki Kaisha Hosokawa Yoko, Tokyo, Japan

[21] Appl. No.: 342,704

[22] Filed: Jan. 25, 1982

[30] Foreign Application Priority Data

Apr. 18, 1981 [JP] Japan .................. 56-55997[U]

[51] Int. Cl.³ .............. B65D 85/00; B65D 53/00; B32B 15/08; B32B 27/00
[52] U.S. Cl. .............................. 426/126; 215/232; 215/347; 215/349; 426/106; 428/35; 428/232; 428/347; 428/349
[58] Field of Search ............... 426/106, 126; 215/232, 215/347, 349; 428/35, 461, 515, 520

[56] References Cited

U.S. PATENT DOCUMENTS

| | | | |
|---|---|---|---|
| 3,524,905 | 8/1970 | Coates | 428/461 |
| 4,064,296 | 12/1977 | Bornstein et al. | 428/515 |
| 4,128,185 | 12/1978 | Wszolek | 215/349 |
| 4,168,253 | 9/1979 | Hollis | 428/461 |
| 4,209,126 | 6/1980 | Elias | 215/232 |
| 4,240,993 | 12/1980 | Sun | 428/520 |
| 4,260,438 | 4/1981 | Dembicki et al. | 215/232 |
| 4,281,045 | 7/1981 | Sumi et al. | 428/515 |
| 4,332,846 | 6/1982 | Fischer et al. | 428/461 |
| 4,349,644 | 9/1982 | Iwanami et al. | 428/515 |

Primary Examiner—William R. Dixon, Jr.
Attorney, Agent, or Firm—Wenderoth, Lind & Ponack

[57] ABSTRACT

A heat-sealing sheet material can be obtained by forming, on one side of a sheet base material such as aluminum foil, a sealant layer composed of a graft copolymer comprising a trunk polymer of a 20 to 60% saponification product of an ethylene/vinyl acetate copolymer having a vinyl acetate content of 15 to 45% by weight and a branch polymer of an unsaturated carboxylic acid in a proportion of 10% by weight or less of the partially-saponified product. This sheet material exhibits excellent heat-sealing strength with respect to glass containers, and, moreover, there is almost no decrease in the sealing strength even when the material has been in contact with water. Accordingly, the sheet material is suitable as a sealing material for the opening rims of glass containers for water-containing food products such as jams and pickles.

8 Claims, 3 Drawing Figures

HEAT-SEALING SHEET MATERIAL

BACKGROUND OF THE INVENTION

The present invention relates to a heat-sealing sheet material which can be used, for example, as a material for covers to be affixed onto the opening rims of glass containers for food products.

As examples of the adhesive resins for glass, there are known formal resins, polyvinyl formal, ethylene/vinyl acetate copolymers and partially-saponified products of ethylene/vinyl acetate copolymers. These adhesive resins are being used mainly as an intermediate bonding layer of laminated glasses or a coat on glass containers for breakage prevention.

As the heat-sealing sheet materials for glass containers, there are known hot-melt processed sheet materials in which an ethylene/vinyl acetate copolymer having a high vinyl acetate content or a partially-saponified product of an ethylene/vinyl acetate copolymer is mixed with additives such as tackifier and wax. Because of their deficient water resistance, these materials are used only for glass containers for powdery food products and cannot be applied for the containers for foods of high water content such as jams and pickles.

Of the above heat-sealing sheet materials, those containing aldehydes such as formal resins and polyvinyl formal have high water resistance. However, their use in food packaging is not desirable because of toxicity from the standpoint of food sanitation.

SUMMARY OF THE INVENTION

The present invention is intended to provide a heat-sealing sheet material which has excellent water resistance, has no toxicity, and can be used even as a material for covers of glass containers for food products.

Namely, the heat-sealing sheet material of the present invention is a heat-sealing sheet material which comprises a base sheet and a sealant layer formed on one side of the base sheet, the sealant being a graft copolymer comprising a trunk polymer of a 20 to 60% saponification product of an ethylene/vinyl acetate copolymer (EVA) of a vinyl acetate content of 15 to 45% by weight and a branch polymer of an unsaturated carboxylic acid of 10% by weight or less of the partially saponified EVA. Using a graft copolymer of the above-mentioned particular composition, the heat-sealing sheet material of the present invention not only excels in adhesiveness with respect to glass containers but also maintains strong adhesive strength even in contact with water and furthermore has low toxicity.

DETAILED DESCRIPTION OF THE INVENTION

Figure 1:
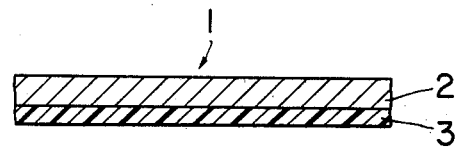
FIG. 1 is a fragmentary sectional view showing one example of the heat-sealing sheet material of the present invention.
Figure 2:
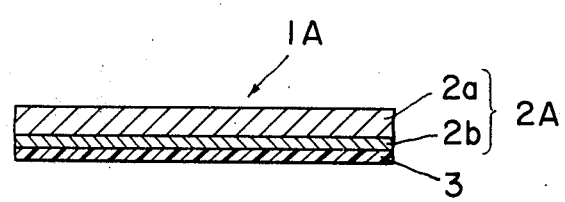
FIG. 2 is a fragmentary sectional view of another example.

FIG. 1 is a fragmentary sectional view showing a basic example of the heat-sealing sheet material of the present invention. The heat-sealing sheet material 1 comprises a base sheet 2 and a sealant layer 3 formed on one side of the base sheet 2. As the base sheet 2, metal foils, for example, of aluminum, papers, sheets of synthetic resins such as oriented polyolefin, polyester, oriented nylon and polyvinyl chloride and other sheet materials are used. The thickness of the base sheet 2 is not particularly limited, but when used as an inside cover for glass containers for food products, the base material should preferably have a relatively small thickness of 20 to 100$\mu$ and yet have excellent gas barrier properties. One more preferred example meeting this purpose is a heat-sealing sheet material 1A shown in FIG. 2 comprising a laminate 2A as a base sheet, consisting of an aluminum foil 2a of 50$\mu$ thickness and a polyethylene film 2b of 20$\mu$ thickness laminated on one side of the aluminum foil 2a, and a sealant layer 3 formed on the polyethylene film 2b. The presence of this polyethylene film 2b is desirable because it increases adhesive strength between the aluminum foil 2a and the sealant layer 3 and hence overall sealing strength. The polyethylene film can be formed on the aluminum foil by a method such as extrusion lamination. At that time, applying an anchor coat such as that of an isocyanate type beforehand on the aluminum foil is effective in order to obtain a stronger adhesive strength.

According to the present invention, the sealant forming the sealant layer 3 comprises a graft copolymer having a partially-saponified product of an ethylene/vinyl acetate copolymer as a trunk polymer and a polymer of an unsaturated carboxylic acid as a branch polymer grafted onto the trunk polymer. The content of vinyl acetate in the ethylene/vinyl acetate copolymer as the starting material of the trunk polymer is 15 to 45% by weight and preferably about 30% by weight. When the vinyl acetate content is less than 15% by weight, sufficient adhesive strength cannot be obtained because of shortage of polar groups, and when it is higher than 45% by weight, the sealant layer becomes too tacky, resulting in undesirable blocking tendency and poor heat resistance as a film.

The trunk polymer comprises a partially-saponified product of the above-defined ethylene/vinyl acetate copolymer. The saponification degree of the polymer is 20 to 60% and preferably about 50%. When the saponification degree is less than 20%, the hydroxyl groups introduced become insufficient, resulting in insufficient adhesive strength, and when it is over 60%, water-resistant adhesive strength (adhesive strength retained in contact with water or steam) and elongation at breakage decrease with respect to the resulting sealant.

The sealant used in the present invention can be obtained by graft-polymerizing onto the above trunk polymer an unsaturated carboxylic acid of 10% by weight or less of the trunk polymer. As the unsaturated carboxylic acid, acrylic acid, methacrylic acid, crotonic acid, maleic acid, fumaric acid and others are used. Of these acids, maleic acid is the most preferable. The graft polymerization is conducted by graft-polymerizing onto the above trunk polymer a specific quantity of the unsaturated carboxylic acid in the presence of a peroxide catalyst according to the conventional method. The polymerization may be carried out in an emulsion or solution state.

The sealant used in the present invention can also be obtained by firstly graft-polymerizing an unsaturated carboxylic acid onto an ethylene/vinyl acetate copolymer and then saponifying the vinyl acetate portion of the thus obtained graft copolymer.

By the above graft polymerization of a trunk polymer with an unsaturated carboxylic acid, the heat-sealing strength of the sealant obtained is increased and moreover the sealing strength is maintained even under contact with water. The effect of the grafting of the unsaturated carboxylic acid is attained when the content of the acid in the sealant is at least 0.1% by weight. When the content exceeds 10% by weight, side reactions such as crosslinking reaction of the base resin concur, resulting in reduction of processability and physical properties such as melt index.

In order to obtain excellent water-resistant adhesive strength, it is particularly preferable that the content of the unsaturated carboxylic acid be in the range of 2 to 4% by weight.

It is preferred that the sealant layer 3 be formed on the base sheet generally in the thickness of about 10 to 100$\mu$. When the thickness is less than 10$\mu$, the sealing strength becomes insufficient, and, above 100$\mu$, a greater quantity of heat is required for heat sealing, sealing workability becoming worse, whereby stable adhesion cannot be obtained.

Figure 3:
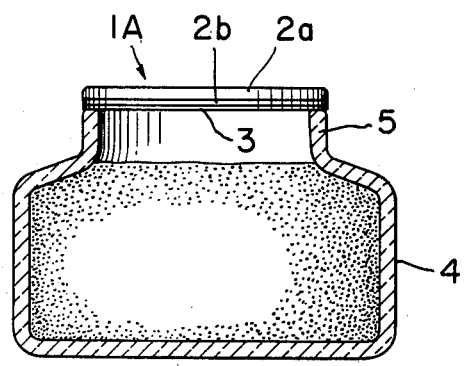
FIG. 3 is a view showing a state in which a cover of the heat-sealing sheet material of FIG. 2 is heat sealed onto the opening rim of a glass container.

The heat-sealing sheet material of the present invention is suitable for use as a material for covers of glass containers. FIG. 3 illustrates one example of such an application. A heat-sealing sheet material 1A is formed in a shape corresponding to the opening 5 of a glass container 4, and is heat-bonded to the opening 5 through the sealant layer 3. For the heat-sealing material of the present invention, an appropriate heat-sealing temperature is about 230° to 350° C. The heat sealing is carried out according to a conventional method such as the induction heat-sealing process using high-frequency electromagnetic waves or the heating plate sealing process. When the sealing is made in such a state that the heat-sealing material is exposed to the vapor pressure of the food product in the glass container as in the case of sealing right after charging of a hot liquid food product into the container, or when the sealing is made onto the rim surface of an opening having irregular projections, the heating plate sealing process is particularly preferable. As described in a patent application to be filed concurrently entitled "PROCESS FOR SEALING GLASS CONTAINER OPENINGS" (Inventors: Susumu Niwa and Masao Koike) (the disclosure of this concurrent application is included herein by reference), the sealing is conducted more preferably by the sequence of firstly preheating the opening rim of the glass container, then placing the cover on the opening rim, heating the cover by a heating plate, and holding the cover against the opening rim by a separate pressing plate.

In order to evaluate the heat sealing characteristics of the heat-sealing sheet material of the present invention, the following tests were conducted.

A base sheet was prepared by extrusion-laminating a polyethylene film of 20$\mu$ thickness on one side of an aluminum foil of 50$\mu$ thickness. On three pieces of this polyethylene layer were formed sealant layers respectively comprising (a) an ethylene/vinyl acetate copolymer (EVA) containing 30% of vinyl acetate, (b) a 50%-sapofinication product of the above EVA, and (c) a graft polymer obtained by graft-polymerizing 3% by weight of maleic acid onto the product (b) to a thickness of 50$\mu$ by extrusion lamination. The three kinds of the heat-sealing sheet materials thus obtained were cut into slips each of 15 mm width. Each slip was placed on a smooth glass plate and was bonded to the glass plate by pressing a heating plate at 280° C. against the slip with a pressure of 2 kg/cm$^2$.

The adhesive strengths (peeling at an angle of 90°, peeling speed of 300 mm/min.) of the three kinds of the laminates thus obtained were measured right after bonding and after 10 days of immersion in water at room temperature.

The results obtained are summarized in the following table.

| | | HEAT-SEALING STRENGTH (g/15 mm) | |
|---|---|---|---|
| | Sealant | Right after heat sealing | After 10 days immersion in water |
| (a) | EVA | 800 | 0 |
| (b) | Partially-saponified product of EVA | 1750 | 0 |
| (c) | Product obtained by graft-polymerizing 3% of maleic acid onto the product (b) | 2000 | 1950 |

The results in the above table show that the heat-sealing sheet material according to the present invention not only has excellent sealing strength but also is excellent in its water resistance, and therefore the sealing strength remains almost the same even after 10 days of immersion in water.

As described hereinabove, the heat-sealing sheet material of the present invention has higher water resistance and higher sealing strength than conventional materials. Accordingly, the material can be utilized also as a cover of glass containers for jams or pickles. Having no toxicity, the material can be safely used as a cover from the standpoint of food sanitation. Furthermore, having excellent heat resistance, the material can withstand the heat of sterilization processes such as hot filling.

What is claimed is:

1. A heat-sealing sheet material which comprises a base sheet and a sealant layer formed on one side of the base sheet, said sealant being a graft copolymer comprising a trunk polymer of a 20 to 60% saponification product of an ethylene/vinyl acetate copolymer (EVA) of a vinyl acetate content of 15 to 45% by weight and a branch polymer of an unsaturated carboxylic acid in a proportion of 10% by weight or less of the graft-copolymer.

2. A heat-sealing sheet material according to claim 1 wherein the base sheet comprises a metal foil.

3. A heat-sealing sheet material according to claim 1 wherein the base sheet comprises a laminate of an aluminum foil and a polyethylene film, and the sealant layer is formed on the polyethylene film.

4. A heat-sealing sheet material according to claim 1 wherein the base sheet has a thickness of 20 to 100$\mu$.

5. A heat-sealing sheet material according to claim 1 wherein the sealant layer has a thickness of 10 to 100$\mu$.

6. A heat-sealing sheet material according to claim 1 wherein the unsaturated carboxylic acid is maleic acid.

7. A sealed glass container which comprises a glass container containing a product and having an opening rim and a heat-sealing sheet material of claim 1 affixed on the opening rim of said container with the sealant layer in heat-sealed contact with the opening rim.

8. A sealed glass container according to claim 7 wherein the product is a water-containing food product.

* * * * *